(12) United States Patent
Wu et al.

(10) Patent No.: US 12,109,852 B2
(45) Date of Patent: Oct. 8, 2024

(54) TIRE PRESSURE SENSOR COMMUNICATION METHOD, DEVICE, ELECTRONIC EQUIPMENT AND STORAGE MEDIUM

(71) Applicant: Shenzhen Yunjia Intelligent Technology Co., Ltd., Guangdong (CN)

(72) Inventors: Huanjian Wu, Guangdong (CN); Xiangyu Jin, Guangdong (CN); Xianping Yang, Guangdong (CN); Kai Wu, Guangdong (CN)

(73) Assignee: Shenzhen Yunjia Intelligent Technology Co., Ltd., Shenzhen (CN)

( * ) Notice: Subject to any disclaimer, the term of this patent is extended or adjusted under 35 U.S.C. 154(b) by 295 days.

(21) Appl. No.: 17/691,118

(22) Filed: Mar. 10, 2022

(65) Prior Publication Data
US 2022/0324273 A1 Oct. 13, 2022

(30) Foreign Application Priority Data

Apr. 7, 2021 (CN) .......................... 202110374215.X

(51) Int. Cl.
*B60C 23/04* (2006.01)

(52) U.S. Cl.
CPC ...... *B60C 23/0454* (2013.01); *B60C 23/0474* (2013.01); *B60C 23/0479* (2013.01); *B60C 23/0488* (2013.01)

(58) Field of Classification Search
CPC ............ B60C 23/0454; B60C 23/0474; B60C 23/0479; B60C 23/0488; B60C 23/0455;
(Continued)

(56) References Cited

U.S. PATENT DOCUMENTS 7,034,671 B2 * 4/2006 Miyazaki ............ B60C 23/0408
340/447
10,870,322 B2 * 12/2020 Liu ..................... B60C 23/0455
(Continued)

FOREIGN PATENT DOCUMENTS

CN 103818204 A * 5/2014

OTHER PUBLICATIONS

Luo CN 103818204 A (Year: 2014).*

*Primary Examiner* — Eric Blount

(57) ABSTRACT

The application discloses a tire pressure sensor communication method, device, electronic equipment and storage medium. The method comprises the follow steps: acquiring a first tire state when a tire pressure sensor is awakened; collecting first tire pressure data corresponding to the first tire state, and determining whether the first tire state meets a preset state switching condition according to the first tire pressure data; controlling the first tire state to switch to a corresponding second tire state if the first tire state meets the state switching condition; acquiring a preset tire pressure data transmission control parameter corresponding to the second tire state; collecting second tire pressure data corresponding to the second tire state according to the tire pressure data transmission control parameter, and sending the second tire pressure data to a vehicle-mounted tire pressure monitoring module.

20 Claims, 4 Drawing Sheets

(58) Field of Classification Search
CPC . B60C 23/0459; B60C 23/0457; B60C 23/02; Y02D 30/70
USPC ........................................................ 340/442
See application file for complete search history.

(56) References Cited

U.S. PATENT DOCUMENTS

| | | | | |
|---|---|---|---|---|
| 2004/0222882 | A1* | 11/2004 | Miyazaki | B60C 23/0408 340/445 |
| 2015/0149110 | A1* | 5/2015 | Shin | B60C 23/0457 702/130 |
| 2019/0070909 | A1* | 3/2019 | Liu | B60C 23/0471 |
| 2021/0221186 | A1* | 7/2021 | Kanbayashi | B60C 23/0461 |

* cited by examiner

TIRE PRESSURE SENSOR COMMUNICATION METHOD, DEVICE, ELECTRONIC EQUIPMENT AND STORAGE MEDIUM

CROSS REFERENCE TO RELATED APPLICATIONS

The present application claims the benefit of Chinese Patent Application No. 202110374215.X filed on Apr. 7, 2021, the contents of which are incorporated herein by reference in their entirety.

TECHNICAL FIELD

The application relates to the technical field of automobiles, in particular to a tire pressure sensor communication method, device, electronic equipment and storage medium.

BACKGROUND

Tire pressure monitoring system (TPMS) is a new technology to improve Automobile Active Safety. It adopts the latest automobile electronic technology, sensor technology, wireless transmitting and receiving technology, etc., and uses the high-sensitivity micro wireless sensor device fixed in the automobile tire to collect the data of automobile tire pressure, temperature, dual-axis acceleration, etc., and transmits the data to the host computer in the cab through high-frequency signals. And the host computer displays the related data such as the automobile tire pressure and temperature in real time in a digital form, and alerts the driver with the automobile active safety system to carry out early warning in the form of turning on the tire pressure failure light when the tires are abnormal, thereby reducing the probability of tire burst and tire damage of a vehicle, and reducing oil consumption and damage of vehicle components.

Because the original tire pressure sensors of some vehicle types are expensive, in order to save maintenance costs, some manufacturers provide non-original tire pressure sensors. However, the communication protocols between tire pressure sensors of different vehicle types and vehicle-mounted tire pressure monitoring modules are different, the non-original tire pressure sensor has the problem that it can't be compatible with vehicle-mounted tire pressure monitoring module of vehicle from original factory.

SUMMARY

The present application aims at solving one of the technical problems in the related art at least to a certain extent. To this end, it is an object of the present application to provide a tire pressure sensor communication method, device, electronic equipment and storage medium.

In order to achieve the above object, in a first aspect, a tire pressure sensor communication method according to an embodiment of the present application includes:

acquiring a first tire state when a tire pressure sensor is awakened;

collecting first tire pressure data corresponding to the first tire state, and determining whether the first tire state meets a preset state switching condition according to the first tire pressure data; controlling the first tire state to switch to a corresponding second tire state if the first tire state meets the state switching condition;

acquiring a preset tire pressure data transmission control parameter corresponding to the second tire state;

collecting second tire pressure data corresponding to the second tire state according to the tire pressure data transmission control parameter, and sending the second tire pressure data to a vehicle-mounted tire pressure monitoring module.

According to an embodiment of the present application, acquiring a first tire state when a tire pressure sensor is awakened includes:

waking up the tire pressure sensor when a periodic wake-up signal is detected, so as to collect initial tire pressure data of a tire by the tire pressure sensor;

determining the first tire state of the tire pressure sensor according to the initial tire pressure data.

According to an embodiment of the present application, the first tire pressure data includes a vehicle speed and/or a tire pressure change value within a preset time period.

According to an embodiment of the present application, each of the first tire state and the second tire state is any one of a parking deflated state, a stop state, a driving state, a driving deflated state, a pause state, and a pause deflated state.

According to an embodiment of the present application, when the first tire state is a parking deflated state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition includes:

collecting a first tire pressure change value of the tire, and determining whether the first tire pressure change value is less than a preset pressure value;

switching the parking deflated state to a stop state, if the first tire pressure change value is less than the preset pressure value.

According to an embodiment of the present application, when the first tire state is a stop state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition includes:

collecting a second tire pressure change value of the tire, and determining whether the second tire pressure change value is greater than a preset pressure value; switching the stop state to a parking deflated state if the second tire pressure change value is greater than the preset pressure value; collecting a first vehicle speed of the tire and determining whether the first vehicle speed is greater than a preset vehicle speed, if the second tire pressure change value is less than or equal to the preset pressure value; controlling the stop state to switch to a driving state, if the first vehicle speed is greater than the preset vehicle speed.

According to an embodiment of the present application, when the first tire state is a pause state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition includes:

collecting a third tire pressure change value of the tire, and determining whether the third tire pressure change value is greater than a preset pressure value; switching the pause state to a pause deflated state if the third tire pressure change value is greater than the preset pressure value; collecting a second vehicle speed of the tire and determining whether the second vehicle speed is greater than a preset vehicle speed, if the third tire pressure change value is less than or equal to the preset pressure value;

controlling the pause state to switch to a driving state, if the second vehicle speed is greater than the preset vehicle speed, and controlling the pause state to switch to a stop state, if the second vehicle speed is less than or equal to the preset vehicle speed with a duration greater than a preset time.

According to an embodiment of the present application, when the first tire state is a driving state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition includes:

collecting a fourth tire pressure change value of the tire, and determining whether the fourth tire pressure change value is greater than a preset pressure value; switching the driving state to a driving deflated state if the fourth tire pressure change value is greater than the preset pressure value; collecting a third vehicle speed of the tire and determining whether the third vehicle speed is less than a preset vehicle speed, if the fourth tire pressure change value is less than or equal to the preset pressure value;

controlling the driving state to switch to a pause state, if the third vehicle speed is less than the preset vehicle speed.

According to an embodiment of the present application, when the first tire state is a pause deflated state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition includes:

collecting a fifth tire pressure change value of the tire, and determining whether the fifth tire pressure change value is less than a preset pressure value; switching the pause deflated state to a pause state if the fifth tire pressure change value is less than the preset pressure value; collecting a fourth vehicle speed of the tire and determining whether the fourth vehicle speed is greater than a preset vehicle speed, if the fifth tire pressure change value is greater than or equal to the preset pressure value;

controlling the pause deflated state to switch to a driving deflated state, if the fourth vehicle speed is greater than the preset vehicle speed.

According to an embodiment of the present application, when the first tire state is a driving deflated state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition includes:

collecting a sixth tire pressure change value of the tire, and determining whether the sixth tire pressure change value is less than a preset pressure value; switching the driving deflated state to a driving state if the sixth tire pressure change value is less than the preset pressure value; collecting a fifth vehicle speed of the tire and determining whether the fifth vehicle speed is less than a preset vehicle speed, if the sixth tire pressure change value is greater than or equal to the preset pressure value;

controlling the driving deflated state to switch to a pause deflated state, if the fifth vehicle speed is less than the preset vehicle speed.

According to an embodiment of the present application, the tire pressure data transmission control parameter includes a wake-up period of the tire pressure sensor and a frequency of sending a data frame to a vehicle-mounted tire pressure monitoring module;

the step of collecting second tire pressure data corresponding to the second tire state according to the tire pressure data transmission control parameter, and sending the second tire pressure data to a vehicle-mounted tire pressure monitoring module, includes:

waking up the tire pressure sensor according to the wake-up period, and collecting second tire pressure data corresponding to the second tire state when the tire pressure sensor is awakened; and sending the second tire pressure data to a vehicle-mounted tire pressure monitoring module according to the frequency.

According to an embodiment of the present application, the first tire state, the second tire state, the state switching condition and the tire pressure data transmission control parameter corresponding to the second tire state are preset according to a communication protocol between the tire pressure sensor and the vehicle-mounted tire pressure monitoring module.

In a second aspect, a tire pressure sensor communication device according to an embodiment of the present application includes:

a first acquisition unit, configured to acquire a first tire state when a tire pressure sensor is awakened;

a state processing unit, configured to collect first tire pressure data corresponding to the first tire state, and determine whether the first tire state meets a preset state switching condition according to the first tire pressure data; control the first tire state to switch to a corresponding second tire state if the first tire state meets the state switching condition;

a second acquisition unit, configured to acquire a preset tire pressure data transmission control parameter corresponding to the second tire state;

a sending unit, configured to collect second tire pressure data corresponding to the second tire state according to the tire pressure data transmission control parameter, and send the second tire pressure data to a vehicle-mounted tire pressure monitoring module.

In a third aspect, an electronic equipment provided according to an embodiment of the present application includes: a memory, a processor and a computer program stored in the memory and running on the processor, and the processor implements the tire pressure sensor communication method as described above when executing the computer program.

In a fourth aspect, a computer storage medium provided according to an embodiment of the present application, has a computer program stored thereon, and the program, when executed by a processor, realizes the tire pressure sensor communication method as described above.

According to the tire pressure sensor communication method, device, electronic equipment and storage medium provided by the embodiments of the present application, by controlling the tire pressure sensor to switch between different tire states and setting the tire pressure data transmission control parameter in different tire states, the tire pressure sensor is guaranteed to transmit high-frequency data according to the requirements of a predetermined communication protocol, so that the compatibility of the tire pressure sensor is improved, and the tire pressure sensor of a non-original factory can also be compatible with the original vehicle type.

Additional aspects and advantages of the present application will be set forth in part in the description as follows, and in part become apparent from the following description, or may be learned by practice of the application.

BRIEF DESCRIPTION OF DRAWINGS

In order to explain the technical solution of the embodiments of the present application or the technical solutions in the prior art more clearly, the drawings used in the description of the embodiments of the application will be briefly introduced below. Obviously, the drawings in the following description show only some embodiments of the application, and for those of ordinary skill in the field, other drawings may be obtained according to these drawings without any creative effort.

Figure 1:
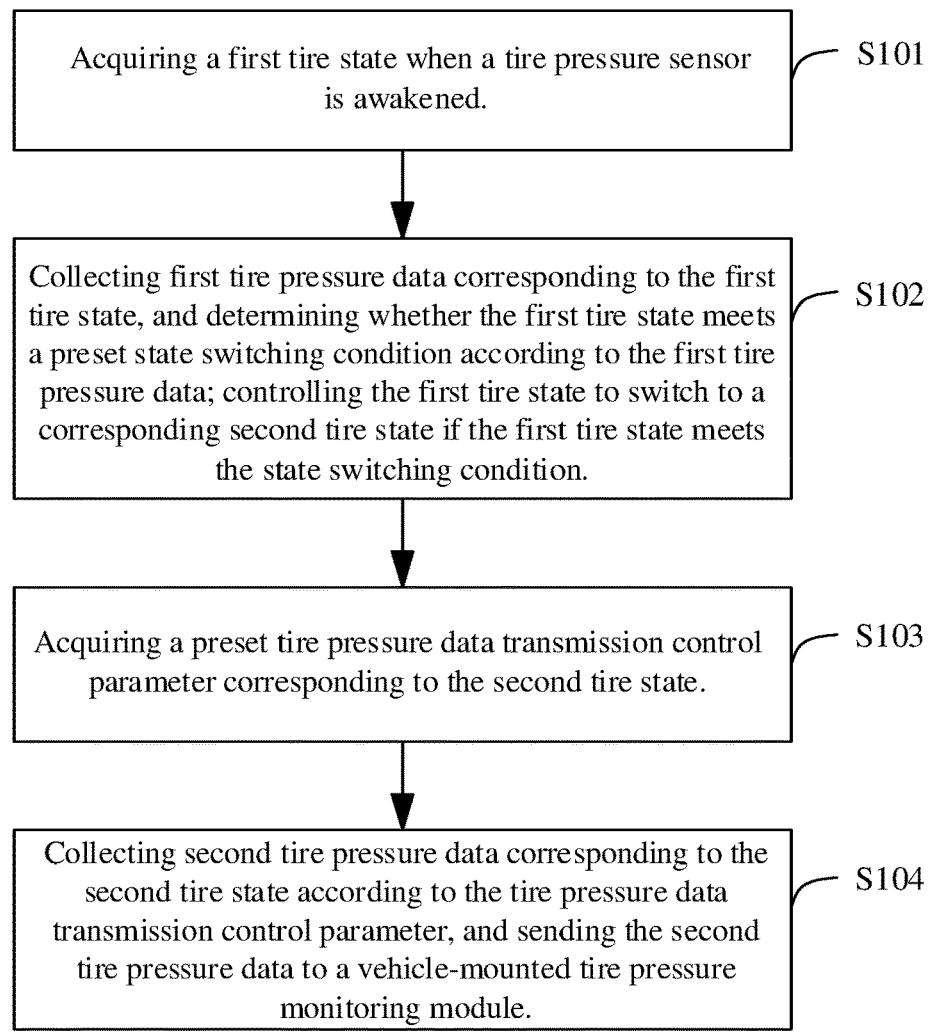
FIG. 1 is a flowchart of an embodiment of a pressure sensor communication method of the present application.

The implementation, functional features and advantages of the present application will be further explained with reference to the drawings in combination with the embodiments.

DETAILED DESCRIPTION OF DISCLOSED EMBODIMENTS

Hereinafter, embodiments of the present application will be described in detail, examples of which are shown in the drawings, in which the same or similar reference signs indicate the same or similar elements or elements with the same or similar functions throughout. The embodiments described below with reference to the drawings are exemplary, only for explaining the present application, and are not to be construed as limitations of the present application.

The tire pressure sensor from original factory communicates with the vehicle-mounted tire pressure monitoring module on the car according to the predetermined communication protocol, and the tire pressure data is collected by the tire pressure sensor and sent to the vehicle tire pressure monitoring module, which displays and monitors the tire pressure data, such as tire pressure alarm.

Because the original tire pressure sensors of some vehicle types are expensive, in order to save maintenance costs, some manufacturers provide non-original tire pressure sensors. However, the communication protocols between tire pressure sensors of different vehicle types and vehicle-mounted tire pressure monitoring modules are different, the non-original tire pressure sensor has the problem that it can't be compatible with vehicle-mounted tire pressure monitoring module of vehicle from original factory.

The application provides a tire pressure sensor communication method, which includes the following steps: acquiring a first tire state when a tire pressure sensor is awakened; collecting first tire pressure data corresponding to the first tire state, and determining whether the first tire state meets a preset state switching condition according to the first tire pressure data; controlling the first tire state to switch to a corresponding second tire state if the first tire state meets the state switching condition; then, acquiring a preset tire pressure data transmission control parameter corresponding to the second tire state; finally, collecting second tire pressure data corresponding to the second tire state according to the tire pressure data transmission control parameter, and sending the second tire pressure data to a vehicle-mounted tire pressure monitoring module. In this way, it can be ensured that the non-original factory tire pressure sensor can send data according to the predetermined communication protocol requirements, so as to improve the compatibility of the non-factory tire pressure sensor and make the non-factory tire pressure sensor compatible with the original factory vehicle type.

Referring to FIG. 1, FIG. 1 shows the flowchart a tire pressure sensor communication method provided by an embodiment of the present application, and for convenience of description, only the parts related to the embodiment of the present application are shown. Specifically, the tire pressure sensor communication method includes the following steps:

S101: acquiring a first tire state when a tire pressure sensor is awakened.

Specifically, the tire pressure sensor is usually provided in the tire, and generally integrates a pressure sensor, a temperature sensor and an acceleration sensor (such as XZ dual-axis acceleration sensor). Therefore, the tire pressure sensor may collect tire pressure data, such as data of tire pressure, temperature and dual-axis acceleration over a period of time. The tire pressure data contains data such as tire pressure, temperature and dual-axis acceleration, which are directly related to the tire state. Therefore, the tire state of the tire pressure sensor during wake-up can be determined according to these data.

For example, in step S101, the step of acquiring a first tire state when a tire pressure sensor is awakened may include: waking up the tire pressure sensor when a periodic wake-up signal is detected, so as to collect initial tire pressure data of a tire by the tire pressure sensor. And then determining the first tire state of the tire pressure sensor according to the initial tire pressure data. That is, the tire pressure sensor is awakened according to a preset wake-up period, and the tire pressure data of the tire is collected every time the tire pressure sensor is awakened, so that the power consumption can be reduced by this periodic wake-up working mode.

S102: collecting first tire pressure data corresponding to the first tire state, and determining whether the first tire state meets a preset state switching condition according to the first tire pressure data; controlling the first tire state to switch to a corresponding second tire state if the first tire state meets the state switching condition.

It should be noted that the first tire state, the second tire state, the state switching condition and the tire pressure data transmission control parameter corresponding to the second tire state are preset according to a communication protocol between the tire pressure sensor and the vehicle-mounted tire pressure monitoring module.

For different vehicle types, in order to enable the data sent by the tire pressure sensor compatible with the communication protocol of the original vehicle-mounted tire pressure monitoring module, the communication protocol between the original tire pressure sensor and the vehicle-mounted tire pressure monitoring module should be analyzed first, so as to obtain the information such as the tire state, state switching condition and the tire pressure data transmission control parameter corresponding to each tire state that meet the protocol standard, and to preset different tire states and state switching conditions in the program according to these information.

In this step, after collecting first tire pressure data corresponding to the first tire state, it is necessary to determine whether the first tire state meets a preset state switching condition according to the first tire pressure data. Because the vehicle is dynamic in use, its tire state may change, and when the tire state changes, the tire pressure data collected by the tire pressure sensor would be different, so it can be judged whether the tire state of the vehicle changes according to the change of the first tire pressure data. If there is a change, the tire state is switched. For example, the tire state is switched from the first tire state to the second tire state.

S103: acquiring a preset tire pressure data transmission control parameter corresponding to the second tire state, and the tire pressure data transmission control parameter may include a wake-up period of the tire pressure sensor and a frequency of sending a data frame to a vehicle-mounted tire pressure monitoring module. For example, the wake-up period is T seconds, and the frequency of sending a data frame is one data frame every T seconds.

S104: collecting second tire pressure data corresponding to the second tire state according to the tire pressure data transmission control parameter, and sending the second tire pressure data to a vehicle-mounted tire pressure monitoring module. In which, the vehicle-mounted tire pressure monitoring module is generally integrated in BCM (Body Control Model) or may be set individually.

Different tire states correspond to different tire pressure data transmission control parameters, therefore, after the tire state is switched, the tire pressure data transmission control parameter corresponding to the current tire state (the second tire state) are set, and the tire pressure sensor can collect data according to the tire pressure data transmission control parameter, so as to adapt to different tire states and collect data with different tire pressure data transmission control parameters. For instance, the wake-up period of the first tire state is 5 seconds, while after switching to the second tire state, the wake-up period is 10 seconds, and it wakes up every 10 seconds. After waking up, the second tire pressure data is collected and sent to the vehicle-mounted tire pressure monitoring module. For example, the second tire pressure data can be subjected to data framing according to a communication protocol format and then sent to the vehicle-mounted tire pressure monitoring module. In this way, under different tire states, the tire pressure sensor can meet the protocol requirements with the vehicle-mounted tire pressure monitoring module, matching the format of the tire pressure data transmitted with the vehicle-mounted tire pressure monitoring module can be ensured, and the compatibility between the non-original tire pressure sensor and vehicle-mounted tire pressure monitoring module on different vehicle types is realized.

According to the tire pressure sensor communication method provided by the embodiments of the present application, by controlling the tire pressure sensor to switch between different tire states and setting the tire pressure data transmission control parameter in different tire states, the tire pressure sensor is guaranteed to transmit high-frequency data according to the requirements of a predetermined communication protocol, so that the compatibility of the tire pressure sensor is improved, and the tire pressure sensor of a non-original factory is able to be compatible with the original vehicle type.

It can be understood that the first tire pressure data can specifically include a vehicle speed and/or a tire pressure change value within a preset time period, and the vehicle speed may be calculated according to the dual-axis acceleration data.

In an embodiment of the present application, in step S102, determining whether the first tire state meets a preset state switching condition includes: determining whether the first tire state meets the preset state switching condition according to the vehicle speed and tire pressure change value in the received first tire pressure data.

That is, in the present embodiment, the tire state is determined by the vehicle speed and the tire pressure change value, and the change of the vehicle speed can be used to judge whether the tire is in stop state or driving state, and the tire pressure change value may be used to judge whether the tire is deflated. In this way, the tire state can be comprehensively judged by the vehicle speed and the tire pressure change value, for example, the vehicle speed is greater than a preset vehicle speed, and the change of the tire pressure value within a preset time is greater than a preset tire pressure value, then the tire is judged to be changed from the first tire state to the second tire state, and the tire state can be accurately judged by the vehicle speed and the tire pressure change value.

For example, any each of the first tire state and the second tire state may be any one of a parking deflated state, a stop state, a driving state, a driving deflated state, a pause state, and a pause deflated state. And the first tire state and the second tire state are two different states. The parking deflated state refers to the state in which the vehicle tires are inflated or deflated when the vehicle is parked. The stop state refers to the state when the vehicle is stationary for more than a certain time limit. The driving state refers to the state that the vehicle is driving at a certain speed. The pause state refers to the state in which the vehicle may start driving again at any time although it is stationary, which is the intermediate transition state of the vehicle from the driving state to the stop state. The pause deflated state refers to the state in which the vehicle tire deflates when the vehicle is in the pause state. The driving deflated state refers to the state in which the vehicle tire deflates when the vehicle is in the driving state.

In some embodiments of the present application, when the first tire state is a parking deflated state, step S102 includes:
collecting a first tire pressure change value of the tire, and determining whether the first tire pressure change value is less than a preset pressure value;
switching the parking deflated state to a stop state, if the first tire pressure change value is less than the preset pressure value.

When the first tire state is a stop state, step S102 includes:
collecting a second tire pressure change value of the tire, and determining whether the second tire pressure change value is greater than a preset pressure value; switching the stop state to a parking deflated state if the second tire pressure change value is greater than the preset pressure value; collecting a first vehicle speed of the tire and determining whether the first vehicle speed is greater than a preset vehicle speed, if the second tire pressure change value is less than or equal to the preset pressure value; controlling the stop state to switch to a driving state, if the first vehicle speed is greater than the preset vehicle speed.

When the first tire state is a pause state, step S102 includes:
collecting a third tire pressure change value of the tire, and determining whether the third tire pressure change value is greater than a preset pressure value; switching the pause state to a pause deflated state if the third tire pressure change value is greater than the preset pressure value; collecting a second vehicle speed of the tire and determining whether the second vehicle speed is greater than a preset vehicle speed, if the third tire pressure change value is less than or equal to the preset pressure value;
controlling the pause state to switch to a driving state, if the second vehicle speed is greater than the preset vehicle speed, and controlling the pause state to switch to a stop state, if the second vehicle speed is less than or equal to the preset vehicle speed with a duration greater than a preset time.

When the first tire state is a driving state, step S102 includes:
collecting a fourth tire pressure change value of the tire, and determining whether the fourth tire pressure change value is greater than a preset pressure value; switching the driving state to a driving deflated state if the fourth tire pressure change value is greater than the preset pressure value; collecting a third vehicle speed of the tire and determining whether the third vehicle speed is less than a preset vehicle speed, if the fourth tire pressure change value is less than or equal to the preset pressure value;
controlling the driving state to switch to a pause state, if the third vehicle speed is less than the preset vehicle speed. When the state of the first tire is a pause deflated state, step S102 includes:
collecting a fifth tire pressure change value of the tire, and determining whether the fifth tire pressure change value is less than a preset pressure value; switching the pause deflated state to a pause state if the fifth tire pressure change value is less than the preset pressure value; collecting a fourth vehicle speed of the tire and determining whether the fourth vehicle speed is greater than a preset vehicle speed, if the fifth tire pressure change value is greater than or equal to the preset pressure value;
controlling the pause deflated state to switch to a driving deflated state, if the fourth vehicle speed is greater than the preset vehicle speed.

When the first tire state is a driving deflated state, step S102 includes:
collecting a sixth tire pressure change value of the tire, and determining whether the sixth tire pressure change value is less than a preset pressure value; switching the driving deflated state to a driving state if the sixth tire pressure change value is less than the preset pressure value; collecting a fifth vehicle speed of the tire and determining whether the fifth vehicle speed is less than a preset vehicle speed, if the sixth tire pressure change value is greater than or equal to the preset pressure value;
controlling the driving deflated state to switch to a pause deflated state, if the fifth vehicle speed is less than the preset vehicle speed.

In this embodiment, when different tire states are used as the first tire states, different state switching conditions may be used to determine the state switching, thus realizing the accurate switching among various tire states, and ensuring that data can be collected and transmitted with the corresponding tire pressure data transmission control parameter under different tire states.

Figure 2:
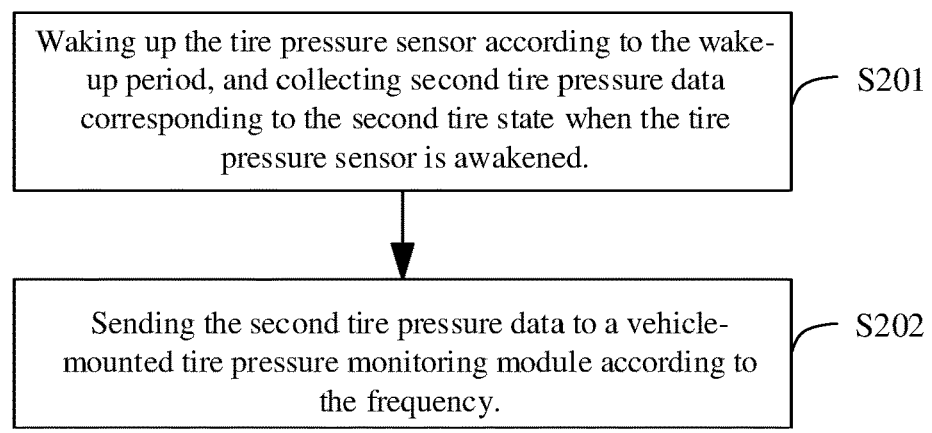
FIG. 2 is a flowchart of step S104 in an embodiment of a tire pressure sensor communication method of the present application.

Referring to FIG. 2, in an embodiment of the present application, when the tire pressure data transmission control parameter includes a wake-up period of the tire pressure sensor and a frequency of sending a data frame to a vehicle-mounted tire pressure monitoring module, step S104 includes:

S201: waking up the tire pressure sensor according to the wake-up period, and collecting second tire pressure data corresponding to the second tire state when the tire pressure sensor is awakened.

S202: sending the second tire pressure data to a vehicle-mounted tire pressure monitoring module according to the frequency.

That is, the tire pressure sensor is awakened according to the wake-up period in the corresponding tire pressure data transmission control parameter under the second tire state, and when the tire pressure sensor is awakened, the second tire pressure data of the tire is collected and transmitted to the vehicle-mounted tire pressure monitoring module. In this way, the power consumption can be reduced by the periodic wake-up working mode, and the collected second tire pressure data can be ensured to be uploaded to the vehicle-mounted tire pressure monitoring module according to a preset frequency, thus realizing effective tire pressure monitoring.

Figure 3:
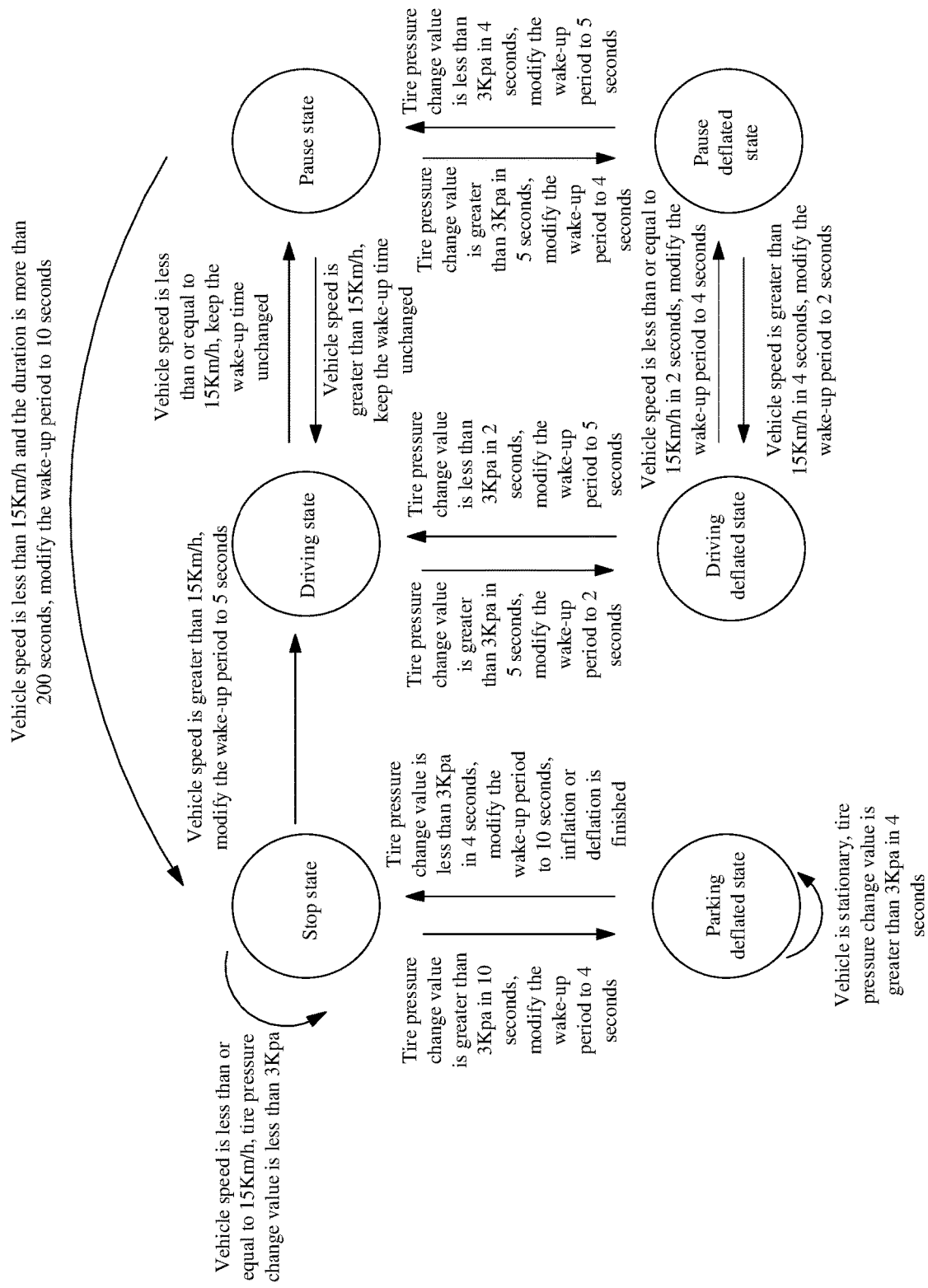
FIG. 3 is a state flowchart of an application example of a tire pressure sensor communication method of the present application.

Referring to FIG. 3, FIG. 3 shows an application example of the tire pressure sensor communication method provided by the embodiment of the present application. Taking a certain type of automobile as an example, this method realizes the switching of different tire states of the tire pressure sensor.

(1) Parking deflated state refers to the state in which the vehicle tires are inflated or deflated when the vehicle is parked. In the parking deflated state, the wake-up period of the tire pressure sensor is 4 seconds, i. e., it wakes up once every 4 seconds, and sends tire pressure data to the vehicle-mounted tire pressure monitoring module at the frequency of sending one data frame every 4 seconds. If the tire pressure change value within 4 seconds is less than 3 Kpa, switch to the stop state, and modify the wake-up period to 10 seconds. In this case, the tire pressure sensor will not send tire pressure data.

(2) Stop state refers to the state when the vehicle is stationary for more than a certain time limit. The tire pressure sensor determines that the vehicle is in the stop state. In the stop state, the wake-up period is 10 seconds, i.e., it wakes up every 10 seconds, collects tire pressure data including a vehicle speed (which can be calculated by dual-axis acceleration) and tire pressure value. If the vehicle speed is greater than 15 Km/h, switch to the driving state, and modify the wake-up period to 5 seconds. At this time, the tire pressure sensor sends the tire pressure data of the stop state again, and then sends the data to the vehicle-mounted tire pressure monitoring module at the frequency of sending one data frame every 10 seconds. If the tire pressure change value is greater than 3 Kpa in 10 seconds, switch to the parking deflated state and modify the wake-up period to 4 seconds. In the parking deflated state, the tire pressure sensor sends data to the vehicle-mounted tire pressure monitoring module at the frequency of sending a data frame every 4 seconds.

(3) Pause state refers to the state in which the vehicle may start driving again at any time although it is stationary, which is the intermediate transition state of the vehicle from the driving state to the stop state. In the pause state, the wake-up period is 5 seconds, i. e., it wakes up every 5 seconds. If the vehicle speed is less than 15 Km/h and the duration is more than 200 seconds, switch to the stop state and modify the wake-up period to 10 seconds. If the vehicle speed is greater than or equal to 15 Km/h, switch to the driving state, modify the wake-up period to 5 seconds, and send data to the vehicle-mounted tire pressure monitoring module at the frequency of sending a data frame every 5 seconds. If the tire pressure change value is greater than 3 Kpa in 5 seconds, switch to the pause deflated state, and modify the wake-up period to 4 seconds. In the pause deflated state, the tire pressure sensor sends data to the vehicle-mounted tire pressure monitoring module at the frequency of sending a data frame every 4 seconds.

(4) Driving state refers to the state that the vehicle is driving at a certain speed. In the driving state, it wakes up every 5 seconds, and collects tire pressure data. If the tire pressure change value is greater than 3 Kpa in 5 seconds, switch to the driving deflated state, and modify the wake-up period to 2 seconds. Every time the tire pressure sensor wakes up, it will send one frame of tire pressure data and feed back the tire pressure change value to the body controller in time. If the vehicle speed is less than 15 Km/h, switch to the pause state and keep the wake-up time unchanged.

(5) Pause deflated state refers to the state in which the vehicle tire deflates when the vehicle is in the pause state. In the pause deflated state, the wake-up period is 4 seconds, i.e., it wakes up every 4 seconds, and collects tire pressure data. If the tire pressure change value is less than 3 Kpa in 4 seconds, switch to the pause state and modify the wake-up period to 5 seconds. If the vehicle speed is greater than or equal to 15 Km/h in 4 seconds, switch to the driving deflated state and modify the wake-up period to 2 seconds.

(6) Driving deflated state refers to the state in which the vehicle tire deflates when the vehicle is in the driving state. In the driving deflated state, the wake-up period is 2 seconds, i.e., it wakes up every 2 seconds, and collects tire pressure data. If the tire pressure change value is less than 3 Kpa in 2 seconds, switch to the driving state and modify the wake-up period to 5 seconds. If the vehicle speed is less than or equal to 15 Km/h in 2 seconds, switch to the pause deflated state and modify the wake-up period to 4 seconds.

Figure 4:
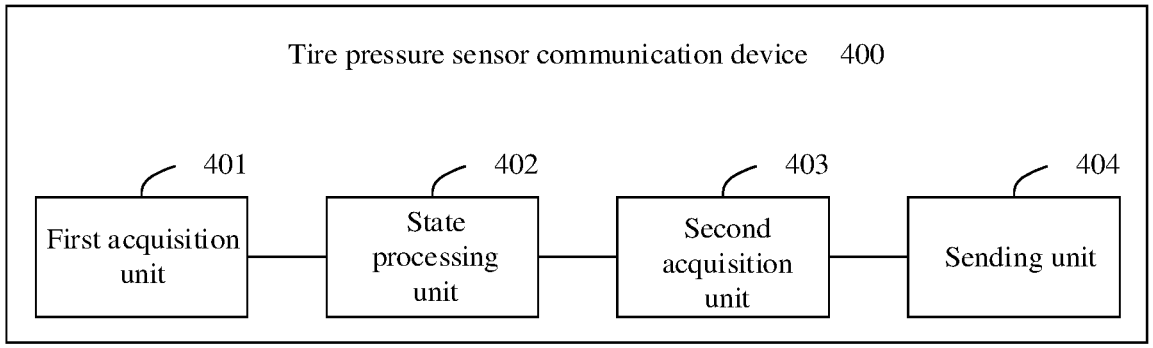
FIG. 4 is a structural schematic diagram of an embodiment of a tire pressure sensor communication device of the present application.

Referring to FIG. 4, FIG. 4 shows the structural schematic diagram of the tire pressure sensor communication device 400 provided by an embodiment of the present application, and for convenience of description, only the parts related to the embodiment of the present application are shown. Specifically, the tire pressure sensor communication device 400 includes:

a first acquisition unit 401, configured to acquire a first tire state when a tire pressure sensor is awakened.

a state processing unit 402, configured to collect first tire pressure data corresponding to the first tire state, and determine whether the first tire state meets a preset state switching condition according to the first tire pressure data; control the first tire state to switch to a corresponding second tire state if the first tire state meets the state switching condition.

a second acquisition unit 403, configured to acquire a preset tire pressure data transmission control parameter corresponding to the second tire state.

Figure 5:
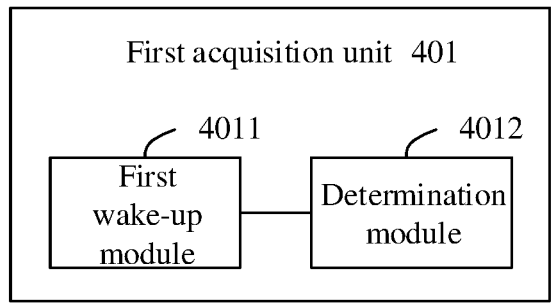
FIG. 5 is a structural schematic diagram of a first acquisition unit in an embodiment of a tire pressure sensor communication device of the present application.
Figure 6:
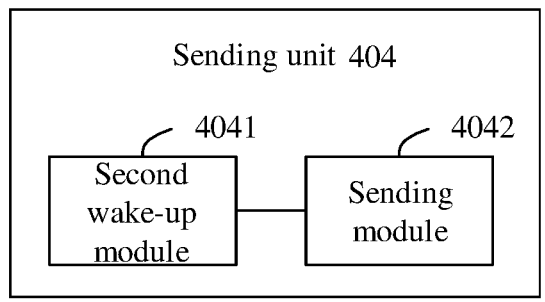
FIG. 6 is a structural schematic diagram of a sending unit in an embodiment of a tire pressure sensor communication device of the present application.

Referring to FIG. 6, in an embodiment of the present application, the tire pressure data transmission control parameter includes a wake-up period of the tire pressure sensor and a frequency of sending a data frame to a vehicle-mounted tire pressure monitoring module. The sending unit 404 includes:

Referring to FIG. 5, in an embodiment of the present application, the first acquisition unit 401 includes:

a first wake-up module 4011, configured to wake up the tire pressure sensor when a periodic wake-up signal is detected, so as to collect initial tire pressure data of a tire by the tire pressure sensor.

a determination module 4012, configured to determine the first tire state of the tire pressure sensor according to the initial tire pressure data.

It can be understood that the first tire pressure data may include a vehicle speed and/or a tire pressure change value within a preset time period.

In a specific application, each of the first tire state and the second tire state is any one of a parking deflated state, a stop state, a driving state, a driving deflated state, a pause state, and a pause deflated state. And the first tire state is different from the second tire state.

In some embodiments of the present application, when the first tire state is a parking deflated state, the state processing unit 402 is specifically configured to: collect a first tire pressure change value of the tire, and determine whether the first tire pressure change value is less than a preset pressure value; switch the parking deflated state to a stop state if the first tire pressure change value is less than the preset pressure value.

When the first tire state is a stop state, the state processing unit 402 is specifically configured to: collect a second tire pressure change value of the tire, and determine whether the second tire pressure change value is greater than a preset pressure value; switch the stop state to a parking deflated state if the second tire pressure change value is greater than the preset pressure value; collect a first vehicle speed of the tire and determine whether the first vehicle speed is greater than a preset vehicle speed, if the second tire pressure change value is less than or equal to the preset pressure value; control the stop state to switch to a driving state, if the first vehicle speed is greater than the preset vehicle speed.

When the first tire state is a pause state, the state processing unit 402 is specifically configured to: collect a third tire pressure change value of the tire, and determine whether the second tire pressure change value is greater than a preset pressure value; switch the pause state to a pause deflated state if the third tire pressure change value is greater than the preset pressure value; collect a second vehicle speed of the tire and determine whether the second vehicle speed is greater than a preset vehicle speed, if the third tire pressure change value is less than or equal to the preset pressure value; control the pause state to switch to a driving state, if the second vehicle speed is greater than the preset vehicle speed, and control the pause state to switch to a stop state, if the second vehicle speed is less than or equal to the preset vehicle speed with a duration greater than a preset time.

When the first tire state is a driving state, the state processing unit 402 is specifically configured to: collect a fourth tire pressure change value of the tire, and determine whether the fourth tire pressure change value is greater than a preset pressure value; switch the driving state to a driving deflated state if the fourth tire pressure change value is greater than the preset pressure value; collect a third vehicle speed of the tire and determine whether the third vehicle speed is less than a preset vehicle speed, if the fourth tire pressure change value is less than or equal to the preset pressure value; control the driving state to switch to a pause state, if the third vehicle speed is less than the preset vehicle speed.

When the first tire state is a pause deflated state, the state processing unit 402 is specifically configured to: collect a fifth tire pressure change value of the tire, and determine whether the fifth tire pressure change value is less than a preset pressure value; switch the pause deflated state to a pause state if the fifth tire pressure change value is less than the preset pressure value; collect a fourth vehicle speed of the tire and determine whether the fourth vehicle speed is greater than a preset vehicle speed, if the fifth tire pressure change value is greater than or equal to the preset pressure value; control the pause deflated state to switch to a driving deflated state, if the fourth vehicle speed is greater than the preset vehicle speed.

When the first tire state is a driving deflated state, the state processing unit 402 is specifically configured to: collect a sixth tire pressure change value of the tire, and determine whether the sixth tire pressure change value is less than a preset pressure value; switch the driving deflated state to a driving state if the sixth tire pressure change value is less than the preset pressure value; collect a fifth vehicle speed of the tire and determine whether the fifth vehicle speed is less than a preset vehicle speed, if the sixth tire pressure change value is greater than or equal to the preset pressure value; control the driving deflated state to switch to a pause deflated state, if the fifth vehicle speed is less than the preset vehicle speed.

Referring to FIG. 6, in an embodiment of the present application, the tire pressure data transmission control parameter includes a wake-up period of the tire pressure sensor and a frequency of sending a data frame to a vehicle-mounted tire pressure monitoring module. The sending unit 404 includes:

- a second wake-up module 4041, configured to wake up the tire pressure sensor according to the wake-up period, and collect second tire pressure data corresponding to the second tire state when the tire pressure sensor is awakened;
- a sending module 4042, configured to send the second tire pressure data to a vehicle-mounted tire pressure monitoring module according to the frequency.

It can be understood that the first tire state, the second tire state, the state switching condition and the tire pressure data transmission control parameter corresponding to the second tire state are preset according to a communication protocol between the tire pressure sensor and the vehicle-mounted tire pressure monitoring module.

It should be noted that all the embodiments in this specification are described in a progressive manner, and each embodiment focuses on the differences from other embodiments, so the same and similar parts among the embodiments can be referred to each other. For the device or system embodiment, because it is basically similar to the method embodiment, the description is relatively brief. Please refer to the description of the method embodiment for relevant information.

According to the tire pressure sensor communication method provided by the embodiments of the present application, by controlling the tire pressure sensor to switch between different tire states and setting the tire pressure data transmission control parameter in different tire states, the tire pressure sensor is guaranteed to transmit high-frequency data according to the requirements of a predetermined communication protocol, so that the compatibility of the tire pressure sensor is improved, and the tire pressure sensor of a non-original factory is able to be compatible with the original vehicle type.

Figure 7:
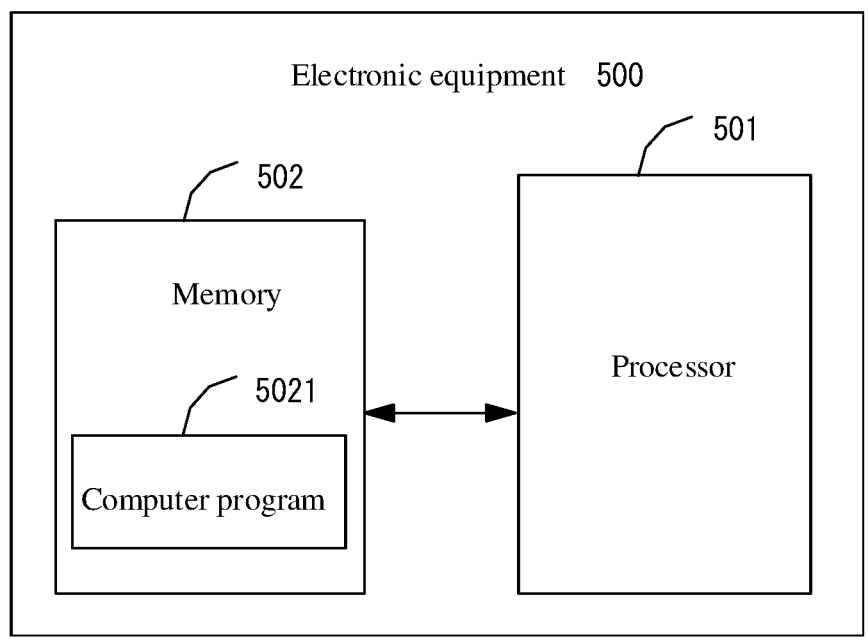
FIG. 7 is a structural diagram of an electronic equipment of the present application.

Referring to FIG. 7, FIG. 7 shows an electronic equipment provided according to an embodiment of the present application, which includes: a memory 502, a processor 501 and a computer program 5021 stored in the memory 502 and running on the processor 501, and the processor 501 implements the tire pressure sensor communication method as described above when executing the computer program 5021.

Illustratively, the computer program 5021 may be divided into one or more modules/units, which are stored in the memory 502 and executed by the processor 501 to complete the present application. The one or more modules/units may be a series of computer program instruction segments capable of performing specific functions, which are used to describe the execution process of the computer program 5021 in the electronic equipment 500.

The electronic equipment 500 may include, but is not limited to, a processor 501 and a memory 502. Those skilled in the art can understand that the FIG. 7 is only an example of the electronic equipment 500, and it does not constitute a limitation on the electronic equipment 500. It may include more or less components than the figure, or combine some components or different components. For example, the electronic equipment 500 may also include input and output devices, network access devices, buses, etc.

The processor 501 may be a Central Processing Unit (CPU), other General Purpose Processor, Digital Signal Processor (DSP), Application Specific Integrated Circuits (ASIC), Field Programmable Gate Array (FPGA) or other programmable logic devices, discrete gate or transistor logic devices, discrete preset hardware components, etc. The General Purpose Processor may be a microprocessor, or the processor may be any conventional processor or the like.

The memory 502 may be an internal storage unit of the electronic equipment 500, such as a hard disk or memory of the electronic equipment 500. The memory 502 may also be an external storage device of the electronic equipment 500, such as a plug-in hard disk, a Smart Media Card (SMC), a Secure Digital (SD) card, a Flash Card, etc, which are equipped on the electronic equipment 500. Further, the memory 502 may also include both internal storage units and external storage devices of the electronic equipment 500. The memory 502 is used to store the computer program 5021 and other programs and data required by the electronic equipment 500. The memory 502 may also be used to temporarily store data that has been output or will be output.

The embodiment of the present application further provides a computer storage medium, on which a computer program 5021 is stored, and the program, when executed by a processor 501, realizes the tire pressure sensor communication method as described above.

The computer program 5021 may be stored in a computer-readable storage medium, and when executed by the processor 501, the computer program 5021 can realize the steps of each method embodiment described above. The computer program 5021 includes computer program code, which may be in the form of source code, object code, executable file or certain intermediate forms. The computer-readable medium may include any entity or device capable of carrying the computer program code, recording medium, U disk, removable hard disk, magnetic disk, optical disk, computer memory, Read-Only Memory (ROM), Random Access Memory (RAM), electric carrier signal, telecommunication signal and software distribution medium, etc.

It should be noted that the contents of the computer-readable medium may be appropriately increased or decreased according to the requirements of legislation and patent practice in jurisdictions. For example, in some jurisdictions, according to legislation and patent practice, the computer-readable medium does not include electric carrier signal or telecommunication signal.

In the above embodiments, the description of each embodiment has its own emphasis. For the parts that are not detailed or recorded in certain embodiments, please refer to the related descriptions of other embodiments.

The steps in the method embodiment of the application may be sequentially adjusted, combined or deleted according to actual needs.

The modules or units in the system embodiment of the application may be combined, divided or deleted according to actual needs.

Those of ordinary skill in the art will appreciate that the units and algorithm steps of each example described in connection with the embodiments disclosed herein can be realized by electronic preset hardware, or the combination of computer software and electronic preset hardware. Whether these functions are executed by preset hardware or software depends on the specific application and design constraints of the technical solution. Skilled persons may use different methods to realize the described functions for each specific application, but this realization should not be considered beyond the scope of the present application.

In the embodiments provided by the present application, it should be understood that the disclosed device/electronic equipment 500 and method may be realized in other ways. For example, the embodiment of the device/electronic equipment 500 described above is only schematic. For instance, the division of the modules or units is only a logical function division, and there may be other ways of division in actual implementation, for example, multiple units or components may be combined or integrated into a system, or some features may be omitted or not performed. On the other hand, the mutual coupling or direct coupling or communication connection shown or discussed may be indirect coupling or communication connection through some interfaces, devices or units, and may be in electrical, mechanical or other forms.

The above embodiments are only used to illustrate the technical solutions of this application, but not to limit it. Although the application has been described in detail with reference to the aforementioned embodiments, those of ordinary skill in the art should understand that the technical solutions described in the aforementioned embodiments may still be modified, or some of the technical features may be equivalently replaced. However, these modifications or substitutions do not make the essence of the technical solutions deviate from the spirit and scope of the technical solutions of each embodiment of this application, and should be included in the protection scope of this application.

What is claimed is:

1. A tire pressure sensor communication method, comprising:
    acquiring a first tire state when a tire pressure sensor is awakened;
    collecting first tire pressure data corresponding to the first tire state, and determining whether the first tire state meets a preset state switching condition according to the first tire pressure data; controlling the first tire state to switch to a corresponding second tire state if the first tire state meets the state switching condition;
    acquiring a preset tire pressure data transmission control parameter corresponding to the second tire state;
    collecting second tire pressure data corresponding to the second tire state according to the tire pressure data transmission control parameter, and sending the second tire pressure data to a vehicle-mounted tire pressure monitoring module; and
    the first tire state, the second tire state, the state switching condition and the tire pressure data transmission control parameter corresponding to the second tire state are all obtained by analyzing a communication protocol between an original tire pressure sensor and an original vehicle-mounted tire pressure monitoring module.

2. The tire pressure sensor communication method of claim 1, wherein acquiring a first tire state when a tire pressure sensor is awakened comprises:
    waking up the tire pressure sensor when a periodic wake-up signal is detected, so as to collect initial tire pressure data of a tire by the tire pressure sensor;
    determining the first tire state of the tire pressure sensor according to the initial tire pressure data.

3. The tire pressure sensor communication method of claim 1, wherein the first tire pressure data comprises a vehicle speed and/or a tire pressure change value within a preset time period.

4. The tire pressure sensor communication method of claim 3, wherein each of the first tire state and the second tire state is any one of a parking deflated state, a stop state, a driving state, a driving deflated state, a pause state, and a pause deflated state.

5. The tire pressure sensor communication method of claim 4, wherein when the first tire state is a parking deflated state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition comprises:
    collecting a first tire pressure change value of the tire, and determining whether the first tire pressure change value is less than a preset pressure value;
    switching the parking deflated state to a stop state, if the first tire pressure change value is less than the preset pressure value.

6. The tire pressure sensor communication method of claim 4, wherein when the first tire state is a stop state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition comprises:
    collecting a second tire pressure change value of the tire, and determining whether the second tire pressure change value is greater than a preset pressure value;
    switching the stop state to a parking deflated state if the second tire pressure change value is greater than the preset pressure value; collecting a first vehicle speed of the tire and determining whether the first vehicle speed is greater than a preset vehicle speed, if the second tire pressure change value is less than or equal to the preset pressure value; controlling the stop state to switch to a driving state, if the first vehicle speed is greater than the preset vehicle speed.

7. The tire pressure sensor communication method of claim 4, wherein when the first tire state is a pause state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition comprises:

collecting a third tire pressure change value of the tire, and determining whether the third tire pressure change value is greater than a preset pressure value; switching the pause state to a pause deflated state if the third tire pressure change value is greater than the preset pressure value; collecting a second vehicle speed of the tire and determining whether the second vehicle speed is greater than a preset vehicle speed, if the third tire pressure change value is less than or equal to the preset pressure value;

controlling the pause state to switch to a driving state, if the second vehicle speed is greater than the preset vehicle speed, and controlling the pause state to switch to a stop state, if the second vehicle speed is less than or equal to the preset vehicle speed with a duration greater than a preset time.

8. The tire pressure sensor communication method of claim 4, wherein when the first tire state is a driving state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition comprises:

collecting a fourth tire pressure change value of the tire, and determining whether the fourth tire pressure change value is greater than a preset pressure value; switching the driving state to a driving deflated state if the fourth tire pressure change value is greater than the preset pressure value; collecting a third vehicle speed of the tire and determining whether the third vehicle speed is less than a preset vehicle speed, if the fourth tire pressure change value is less than or equal to the preset pressure value;

controlling the driving state to switch to a pause state, if the third vehicle speed is less than the preset vehicle speed.

9. The tire pressure sensor communication method of claim 4, wherein when the first tire state is a pause deflated state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition comprises:

collecting a fifth tire pressure change value of the tire, and determining whether the fifth tire pressure change value is less than a preset pressure value; switching the pause deflated state to a pause state if the fifth tire pressure change value is less than the preset pressure value; collecting a fourth vehicle speed of the tire and determining whether the fourth vehicle speed is greater than a preset vehicle speed, if the fifth tire pressure change value is greater than or equal to the preset pressure value;

controlling the pause deflated state to switch to a driving deflated state, if the fourth vehicle speed is greater than the preset vehicle speed.

10. The tire pressure sensor communication method of claim 4, wherein when the first tire state is a driving deflated state, the step of collecting first tire pressure data corresponding to the first tire state, and determining whether the first tire state meets a preset state switching condition according to the first tire pressure data; controlling the first tire state to switch to a corresponding second tire state if the first tire state meets the state switching condition comprises:

collecting a sixth tire pressure change value of the tire, and determining whether the sixth tire pressure change value is less than a preset pressure value; switching the driving deflated state to a driving state if the sixth tire pressure change value is less than the preset pressure value;

collecting a fifth vehicle speed of the tire and determining whether the fifth vehicle speed is less than a preset vehicle speed, if the sixth tire pressure change value is greater than or equal to the preset pressure value;

controlling the driving deflated state to switch to a pause deflated state, if the fifth vehicle speed is less than the preset vehicle speed.

11. The tire pressure sensor communication method of claim 1, wherein the tire pressure data transmission control parameter comprises a wake-up period of the tire pressure sensor and a frequency of sending a data frame to a vehicle-mounted tire pressure monitoring module;

the step of collecting second tire pressure data corresponding to the second tire state according to the tire pressure data transmission control parameter, and sending the second tire pressure data to a vehicle-mounted tire pressure monitoring module, comprises:

waking up the tire pressure sensor according to the wake-up period, and collecting second tire pressure data corresponding to the second tire state when the tire pressure sensor is awakened; and sending the second tire pressure data to a vehicle-mounted tire pressure monitoring module according to the frequency.

12. The tire pressure sensor communication method of claim 1, wherein the first tire state, the second tire state, the state switching condition and the tire pressure data transmission control parameter corresponding to the second tire state are preset according to a communication protocol between the tire pressure sensor and the vehicle-mounted tire pressure monitoring module.

13. A tire pressure sensor communication device, comprising:

a first acquisition unit, configured to acquire a first tire state when a tire pressure sensor is awakened;

a state processing unit, configured to collect first tire pressure data corresponding to the first tire state, and determine whether the first tire state meets a preset state switching condition according to the first tire pressure data; control the first tire state to switch to a corresponding second tire state if the first tire state meets the state switching condition;

a second acquisition unit, configured to acquire a preset tire pressure data transmission control parameter corresponding to the second tire state;

a sending unit, configured to collect second tire pressure data corresponding to the second tire state according to the tire pressure data transmission control parameter, and send the second tire pressure data to a vehicle-mounted tire pressure monitoring module; and the first tire state, the second tire state, the state switching condition and the tire pressure data transmission control parameter corresponding to the second tire state are all obtained by analyzing a communication protocol between an original tire pressure sensor and an original vehicle-mounted tire pressure monitoring module.

14. An electronic equipment, comprising a memory, a processor and a computer program stored in the memory and running on the processor, wherein the processor implements the tire pressure sensor communication method of claim 1 when executing the computer program.

15. A computer storage medium on which a computer program is stored, wherein the program, when executed by a processor, realizes the tire pressure sensor communication method of claim 1.

16. The tire pressure sensor communication method of claim 2, wherein the first tire pressure data comprises a vehicle speed and/or a tire pressure change value within a preset time period.

17. An electronic equipment, comprising a memory, a processor and a computer program stored in the memory and running on the processor, wherein the processor implements the tire pressure sensor communication method of claim 2 when executing the computer program.

18. An electronic equipment, comprising a memory, a processor and a computer program stored in the memory and running on the processor, wherein the processor implements the tire pressure sensor communication method of claim 3 when executing the computer program.

19. A computer storage medium on which a computer program is stored, wherein the program, when executed by a processor, realizes the tire pressure sensor communication method of claim 2.

20. A computer storage medium on which a computer program is stored, wherein the program, when executed by a processor, realizes the tire pressure sensor communication method of claim 3.

* * * * *